3,846,091
POLYMER SOLUTION
Desmond Wilfrid John Osmond, Windsor, and Norman Douglas Patrick Smith and Frederick Andrew Waite, Farnham Common, England, assignors to Imperial Chemical Industries Limited, London, England
No Drawing. Filed May 12, 1972, Ser. No. 252,726
Claims priority, application Great Britain, May 13, 1971, 14,642/71
Int. Cl. C10l 1/18
U.S. Cl. 44—62                                    6 Claims

ABSTRACT OF THE DISCLOSURE

A liquid hydrocarbon fuel of flash point at least 90° F. suitable for use in gas turbine engined aircraft, and having a reduced tendency to particulate dissemination on being subjected to shock, the fuel containing therein polymer of molecular weight gerater than $10^6$ (viscosity average) or of intrinsic viscosity greater than 2.5 dls./gram in a concentration such that there is molecular overlap of the polymer molecules in the liquid. The dissolved polymer contains polar groups which form inter-molecular associative bonds arising from electrostatic attraction between polar and/or dipolar charges in the polar groups, the bonds being hydrogen or electrovalent bonds. Useful polymers are the addition copolymers of an alkyl styrene, the alkyl group of which contains from 3 to 20, preferably 3 to 8, and more preferably 3 to 4, carbon atoms. The concentration of polar groups in the liquid is in the range $10^{-7}$ to $10^{-4}$ gram moles of polar group per gram of fuel. Between 0.05 and 1% by weight of the polymer is effective in preventing any substantial ignition of the fuel when tested by a simulated aircraft crash test described in the disclosure.

This invention relates to improved liquid hydrocarbon aircraft fuels.

Vapours of low flash point liquid hydrocarbon aircraft fuels, being readily ignited, are a major hazard under crash conditions. This hazard can be reduced to some extent by using liquid hydrocarbon fuels of flash point not less than 90° F. but even then, mists of such fuels which form when the liquid is subjected to conditions of shock are also readily ignitable.

In United States Patent Application Ser. No. 818,249 we have described how the tendency of liquid hydrocarbon aircraft fuels to form mists when subjected to shock conditions can be reduced by dissolving in the fuel a polymer of molecular weight greater than $10^6$ (viscosity average) or of intrinsic viscosity greater than 2.5 dls./gm. in a concentration such that there is molecular overlap of the dissolved polymer. As, in that earlier application, the term "molecular overlap" describes the condition in which the segment density of the dissolved polymer in the liquid is substantially uniform on a molecular scale and this condition corresponds to concentrations at and above that at which the centres of mass of the polymer molecules are spaced, on average, at twice the radius of gyration of the polymer molecules.

We have now found that the tendency to misting can be further reduced if the dissolved polymer contains polar groups which form inter-molecular associative bonds with each other when the liquid is subjected to shear. The molecular associative bonds are believed to reduce the breakdown into droplets and the consequent formation of mist.

At low concentrations of polar groups in the fuel it is still a free-flowing liquid under low shear conditions and it is believed that it is only under conditions of high shear arising when it is subjected to shock that a highly crosslinked structure resulting from inter-molecular association is formed. However, as the concentration of polar groups in the fuel is increased more inter-molecular associations are present even at low shear conditions and at the higher concentrations of polar groups employed in this invention the liquid begins to exhibit some indications of slight gel structure even at low shear. A further increase in concentration of polar groups in the fuel then results in it exhibiting a gel structure as described and claimed in our United States Patent Ser. No. 3,666,430 but the present invention does not extend to the gelled fuels of this other Patent. In the present invention the fuel is a free-flowing liquid under low shear conditions by which we mean that the fuel has a viscosity less than 10 poise. In preference, however, the modified fuels will have a viscosity less than 1 poise.

By "associative bonds" we mean bonds arising from electrostatic attraction between mono-polar and/or dipolar charges in the polar groups, these bonds being ones which can be broken and re-made without changing the nature of the polar groups. The bonds are hydrogen bonds or electrovalent bonds and we specifically exclude covalent bonds which result from a sharing of electron orbits between polar groups.

We have found that particularly suitable polymers are the addition copolymers of $C_{3-20}$ alkyl styrenes, these polymers also containing suitable polar groups which form inter-molecular associative bonds. The polar groups are introduced into the copolymers either by copolymerising an alkyl styrene with a monomer containing the appropriate polar group or by copolymerising an alkyl styrene with a monomer containing a functional group which can be subsequently modified to provide the appropriate polar group. These polymers, in contrast to polymers obtained by alkylating polystyrene by a Friedel-Crafts condensation reaction as illustrated in Example 14 of U.S. Patent Application No. 171,773, filed Aug. 13, 1971, have a substantially uniform distribution of alkyl groups and hence they have improved solubility characteristics. Moreover, the use of an addition polymerisation process permits the introduction of comonomers which can be selected to modify the solvency of the final polymer.

Suitable alkyl styrenes which can be used in the preparation of the copolymers include n-propyl styrene, n-butyl styrene, n-amyl styrene, n-hexyl styrene and n-dodecyl styrene; sec.-butyl styrene, sec.-amyl styrene, sec.-hexyl styrene and sec.-dodecyl styrene; isopropyl styrene, iso-butyl styrene, iso-amyl styrene, iso-hexyl styrene and iso-dodecyl styrene; tert-butyl styrene, tert-amyl styrene, tert-hexyl styrene and tert-dodecyl styrene.

Preferably the alkyl group contains from 3 to 8 carbon atoms and more particularly from 3 to 4 carbon atoms.

The bond energy between the polar groups should be at least that corresponding to the energy of hydrogen bonds formed in the hydrocarbon liquid between —OH groups of ROH reacting with —O— groups of ROR', where R and R' are alkyl. The bond energy should not be comparable with and certainly must not be greater than that of a typical C—C co-valent bond. The hydrocarbon liquid may contain a small proportion of other liquids, such as ethers, esters, ketones and nitro-paraffins, particularly when the energy of the associative bond in the hydrocarbon liquid would otherwise be higher than the minimum stated above. However, since the nature of the liquid has an effect on the associative bond energy of any particular pair of group arrangements, the energy decreasing as the polarity of the liquid increases, the hydrocarbon liquids to which this invention is to be applied should not contain a substantial proportion of a miscible protolytic liquid such as methanol.

The polar groups may associatively bond with like groups in the same type of polymer or the associative bonding may be between pairs of complementary interacting polar groups, the complementary groups, preferably each being in different polymers which are blended in the liquid. The different polymers must, of course, be compatible in the liquid to provide a homogeneous solution.

Suitable polar groups for associatively cross-linking the polymer structure are those which provide hydrogen bonds and bonds resulting from interaction between monopoles such as ions or between strong dipoles such as those provided by nitrile, nitro, sulphone, aromatic residues substituted with these groups and ion pairs.

Suitable comonomers which contain basic polar groups include vinyl pyridine, vinyl diethylamine, N-N-dimethyl-amino-ethyl methacrylate and tertiary butyl-amino-ethyl (meth) acrylate. Groups such as sulphones may be introduced by vinyl methyl sulphone. Strongly ionic and dipolar groups are preferably introduced after the polymer has been formed, e.g. by neutralisation of acidic groups or quaternisation of basic groups.

Suitable comonomers for modifying the solubility characteristics of the polymer include styrene, vinyl toluene, and acrylic esters such as methyl methacrylate, butyl acrylate and 2-ethyl hexyl acrylate.

Suitable copolymers for use in this invention include poly (tertiary - butyl styrene/acrylic acid) or poly (tert - butyl styrene/methacrylic acid) or poly (tertiary butyl styrene/acrylamide) containing between 1% and 10% by weight of acrylic acid or methacrylic acid or acrylamide.

Suitable comonomers which contain acidic polar groups include acrylic and methacrylic acids, maleic anhydride, vinyl sulphonic acid, vinyl phosphate and phosphonic esters of unsaturated OH-containing compounds such as the phosphonic ester of hydroxy isopropyl methacrylate.

The polymers may be made by conventional methods, for example using a free radical initiator but one particularly suitable method is by aqueous emulsion polymerisation under conditions which provide the necessary high molecular weight. Preferably this polymerisation is carried out at as low a temperature as possible in the presence of a "redox" initiator system for example ammonium persulphate and sodium dithionite. Solution polymerisation may also be used.

Polymer particles obtained by emulsion polymerisation may be isolated and then dissolved in the liquid hydrocarbon. Alternatively the aqueous dispersion of polymer particles may be added to the fuel, the water removed and the polymer simultaneously dissolved by appropriate heating. It is clearly advantageous to prepare the polymer in such particulate form as compared with the preparation of polymer in solution. In the latter case the polymer can only be isolated in a bulk form which may be intractable and dissolve only slowly in the hydrocarbon.

The copolymers of alkyl styrenes, which also contain appropriate polar groups, when prepared by addition polymerisation have good solubility in the liquid hydrocarbon fuels such as Aviation Turbine Fuels Grade JP-8 (flash point 110° F. min.) as specified in U.S. Military Specification MIL-T-83133, Grade JP-5 (flash point 140° F. min.) as specified in U.S. Military Specification MIL-T-5624G, Grades Jet A and Jet A-1 (flash point 110° F. min.) as specified in ASTM Specification D.1655/66T and Grade AVTUR—NATO Code No. F-35 (flash point 100° F. min.) as specified in U.K. Ministry of Aviation Specification No. D. Eng. R.D.2494 (Issue 4).

The proportion of polymer used is normally in the range 0.05%–1% by weight of the liquid fuel.

The basic requirement, however, is that the concentration of polymer is at least that required for molecular overlap and this may be determined by a test in which the viscosity of a range of solutions of polymer in the fuel is measured on a cone and place and concentric cylinder viscometer (e.g. a Weisenberg rheogoniometer or a Contraves Rheomat) at shear rates covering the range 20–20,000 sec.$^{-1}$. In respect of each solution the viscosity is plotted against shear rate and the curve arbitrarily extrapolated at zero shear rate. The zero shear rate viscosities are then plotted against concentration on log/log scales. The log/log scales when plotted for closely spaced concentrations show an upturn at which abnormal viscosity begins to occur. Suitable polymer concentrations to use in the modified fuels are from 1–10 times the proportion at which this upturn occurs and preferably from 1.5–5 times the proportion at which this upturn occurs.

In this test it is, of course, necessary to eliminate during the determination of viscosity the inter-molecular associative bonds. This can be achieved by adding to the solution on which the determinations are carried out a low molecular weight alkyl compound which contains per molecular one polar group which interacts preferentially with the polar groups in the polymer molecule and thus blocks the tendency of the polar groups in the polymer to self-associate.

The resistance of a solution to shock formation of droplets may also be determined by a simple test in which a 10 ml. sample of the modified fuel is dropped in a thin stream from a height of 2 metres into a hollow cylindrical vessel of diameter 17 cm. and height 21 cm. having its sides lined with absorbent paper. In order to facilitate observation a small quantity of soluble dye is added to the sample of fuel. The density and size of the spots produced on the paper by droplets splashed from the sample give an indication of its misting characteristics. The minimum polymer concentration at which there are substantially no spots on the absorbent paper is the minimum useful concentration and in aircraft fuels the polymer concentration should be in the range 1–10 times this minimum concentration, preferably from 1.5–5 times this concentration.

The concentration of polar groups in the liquid fuel should be in the range $10^{-7}$–$10^{-4}$ gm. moles of groups per gm. fuel. Where the bond energy between the polar groups is relatively low, the concentration of groups in the fuel will usually be at the upper end of this range. When the bond energy between the groups is reatively high, e.g. as between strong dipoles, the concentration of groups in the fuel will usually be at the lower end of this range. With medium bond energies, the concentration of groups will usually be around the central part of this range.

Even when metal ions are present in the polymers used in the composition of this invention the proportion of metal so introduced into the hydrocarbon is, due to the high efficiency of the polymer and its low metal content, very low and can be acceptable even in aircraft fuels.

The polymer must be soluble in the fuel and in general the solubility in the liquid hydrocarbon fuel of the polymer devoid of the interacting polar groups should be such that the theta-temperature of the system is below the temperature to which the solution is likely to be subjected, otherwise there is a danger of precipitation of the polymer. The polymer-solvent relationship at the theta-temperature is discussed by P. J. Flory in "Principles of Polymer Chemistry" at pages 612–615. In jet aircraft the lowest temperature to which the fuel is likely to be subjected is about −50° C.

The invention is illustrated by the following Examples in which all proportions and percentages are by weight:

EXAMPLE 1

A mixture of 1,152 parts of water, 288 parts of acetone, 342 parts of tertiary butyl styrene, 18 parts of acrylic acid and 9 parts of "Manoxol" OT (commercially available sodium dioctyl sulpho-succinate) was stirred under nitrogen at 25° C. When the surfactant had dissolved, a two-component addition polymerisation initiator consisting of (a) a solution of 0.18 parts of ammonium persulphate in 8 parts of demineralised water and (b) a solution of 0.312 parts of sodium dithionite in 8 parts of demineralised water was freshly prepared and introduced rapidly into the mixture.

A slow exothermic reaction was observed after about ½ hour and allowed to continue for 6–8 hours the reaction temperature reaching a peak of 35° C. during this time.

The product was a dispersion of a tert butyl styrene/acrylic acid copolymer which had a solids content of 18–20%.

The average diameter of the dispersed particles was 0.02–0.08 microns. The polymer had a molecular weight of $21-38 \times 10^6$ and an intrinsic viscosity at 4.5 dls./gm.

A 2% solution of poly(tertiary-butyl styrene) in a typical aviation fuel, AVTUR 50 (Defence Specification D. Eng. RD 2494) was prepared by stirring the appropriate proportions of the above dispersion and AVTUR 50 at 150° C. and removing the water by azeotropic distillation.

A series of solutions of the polymer ranging from 0.05 to 1% polymer concentration was prepared by dilution of the 2% solution with further AVTUR 50. These solutions were subjected to the "splash test" described in our British Patent Application No. 60720/68 in which there is observed the pattern of liquid splashed produced by allowing the modified fuel (coloured by addition of a dyestuff) to fall into a hollow cylindrical vessel lined with absorbent paper. At 0.1% polymer concentration there was a spatter pattern of small-medium size spots and low-medium frequency, and at 0.2% polymer concentration there was complete absence of spatter.

The solutions were also tested for their resistance to misting and ignition in aircraft crash conditions by the following test method.

The test apparatus consists of a propulsion unit capable of accelerating a small trolley guided along a track to a speed of approximately 120 feet/sec. The trolley is coupled to a braking system which is capable of stopping the trolley at a mean deceleration of 30 times the acceleration of gravity. A fuel tank is attached to the trolley and at the forward end of the fuel tank is an orifice which is closed with a weighted rubber bung. Approximately 45 mls. of the fuel to be tested are placed in the tank and the trolley is winched back to a release point from which it is released and accelerated up to a speed of 120 feet/sec. The acceleration takes place along about 10 feet of the track and the trolley is then decelerated along about 10 feet of the track by the breaking system so that the weighted bung is ejected and the fuel is expelled through the tank orifice.

There is an ignition array of small gas flames spaced linearly at one foot intervals beneath the portion of the track over which deceleration takes place and beyond the track.

When unmodified AVTUR fuel is subjected to the test it produces a flare above the ignition array of 6–7 feet in length and of large volume. On the other hand, when modified AVTUR fuel according to this Example was subjected to the same conditions, 0.1% polymer concentration was effective in preventing any substantial ignition of the fuel.

The number of gram moles of polar groups per gram of fuel at this concentration is $7.0 \times 10^{-7}$.

EXAMPLES 2 TO 9

Further polymeric additives were prepared in a similar manner to that described in Example 1.

A 2% solution of each polymeric additive in AVTUR 50 was prepared by stirring the appropriate proportions of the dispersion of the polymeric additive and AVTUR 50 at an elevated temperature and removing the water by azeotropic distillation.

A series of solutions of each polymer ranging from 0.05 to 1% polymer concentration was prepared by dilution of each 2% solution with further AVTUR 50.

The following table sets out details of each of the copolymers tested and the concentration of each required to completely suppress misting and ignition when tested by the simulated aircraft crash test described in Example 1.

| Example | Copolymer | Monomer ratio | No. of gram moles [1] | Intrinsic viscosity in AVTUR 50 at 25° C. (dls./gram) | Concentration (percent by weight)[2] |
|---|---|---|---|---|---|
| 2 | Tertiary butyl styrene:acrylic acid | 99.5:0.5 | $5.6 \times 10^{-7}$ | 6.5 | 0.8 |
| 3 | do | 99:1 | $1.12 \times 10^{-6}$ | 6.0 | 0.8 |
| 4 | do | 98:2 | $2.24 \times 10^{-6}$ | 7.0 | 0.8 |
| 5 | Tertiary butyl styrene:acrylamide | 95:5 | $1.4 \times 10^{-6}$ | 6.5 | 0.2 |
| 6 | Tertiary butyl styrene:hydroxyethyl methacrylate | 95:5 | $1.52 \times 10^{-6}$ | 3.4 | 0.4 |
| 7 | Tertiary butyl styrene:2 ethyl hexyl acrylate:acrylic acid | 70:25:5 | $1.4 \times 10^{-6}$ | 9.2 | 0.2 |
| 8 | Tertiary butyl styrene:ethyl acrylate:acrylic acid | 80:15:5 | $1.4 \times 10^{-6}$ | 8.4 | 0.2 |
| 9 | Tertiary butyl styrene:methacrylic acid | 95:5 | $2.9 \times 10^{-7}$ | 4.0 | 0.05 |

[1] Polar groups per gram of fuel at the effective concentration.
[2] Required for complete suppression of mist and ignition.

We claim:

1. A liquid hydrocarbon fuel of flash point at least 90° F. suitable for use in gas turbine engined aircraft, and having a reduced tendency to particulate dissemination on being subjected to shock, the fuel containing therein polymer of molecular weight greater than $10^6$ (viscosity average) or of intrinsic viscosity greater than 2.5 dls./gm. in a concentration such that there is molecular overlap of the polymer molecules in the liquid, the dissolved polymer containing polar groups which form inter-molecular associative bonds arising from electrostatic attraction between polar and/or dipolar charges in the polar groups, the bonds being hydrogen or electrovalent bonds, the polymer being an addition copolymer of an alkyl styrene, the alkyl group in which contains from 3 to 20 carbon atoms.

2. A liquid hydrocarbon fuel as claimed in Claim 1 in which the alkyl group in the alkyl styrene contains from 3 to 8 carbon atoms.

3. A liquid hydrocarbon fuel as claimed in Claim 1 in which the alkyl group in the alkyl styrene contains from 3 to 4 carbon atoms.

4. A liquid hydrocarbon fuel as claimed in Claim 3 in which the polymer used is selected from copolymers of tertiary butyl styrene with acrylic acid, methacrylic acid or acrylamide.

5. A liquid hydrocarbon fuel as claimed in Claim 1 in which the concentration of polar groups in the liquid fuel is in the range $10^{-7}$ to $10^{-4}$ gram moles of polar group per gram of fuel.

6. A liquid hydrocarbon fuel as claimed in Claim 1 containing from 0.05% to 1% by weight of the polymer.

(References on following page)

References Cited

UNITED STATES PATENTS

| | | | |
|---|---|---|---|
| 3,527,582 | 9/1970 | Haigh et al. | 44—62 |
| 3,574,575 | 4/1971 | Gee et al. | 44—62 |
| 3,136,743 | 6/1964 | Conway et al. | 252—56 R |
| 3,231,498 | 1/1966 | De Vries | 44—62 |
| 3,326,804 | 1/1957 | Shih-en Hu | 44—62 |
| 3,473,901 | 8/1969 | De Benneville et al. | 44—62 |

OTHER REFERENCES

Defensive Publication T-858,018, Jacobson, N., Multifunctional Polymeric Additive for Mineral Oils, Jan. 21, 1969, Application Ser. No. 664,925.

Kirk-Othmer, Encyclopedia of Chemical Technology, 2nd Edition, Vol. 15, 1968, p. 87.

Tanford, Physical Chemistry of Macromolecules, Wiley, 1961, pp. 165–168; 174–178; 198–200; 402–406.

Miller, The Structure of Polymers, Reinhold, 1966, pp. 190–193; 213, 214.

Porter et al., "The Entanglement Concept in Polymer Systems," Chemical Reviews, Vol. 66, No. 1, 1966, pp. 1–4, 13.

Cohen et al., Journal of Polymer Science, Vol. 49, 1961, pp. 377–383.

Flory, Principles of Polymer Chemistry, Cornell U., 1953, pp. 610–611.

DANIEL E. WYMAN, Primary Examiner

Y. H. SMITH, Assistant Examiner

U.S. Cl. X.R.

44—80